US010627833B2

(12) United States Patent
Bazile et al.

(10) Patent No.: US 10,627,833 B2
(45) Date of Patent: Apr. 21, 2020

(54) AIRCRAFT CONFIGURATION MANAGEMENT METHOD AND DEVICE

(71) Applicants: Airbus Operations SAS, Toulouse (FR); Airbus SAS, Blagnac (FR)

(72) Inventors: Jerôme Bazile, Leguevin (FR); Mathieu Reguerre, Toulouse (FR); Fabrice Butin, Toulouse (FR)

(73) Assignees: Airbus Operations SAS, Toulouse (FR); Airbus SAS, Blagnac (FR)

( * ) Notice: Subject to any disclaimer, the term of this patent is extended or adjusted under 35 U.S.C. 154(b) by 282 days.

(21) Appl. No.: 15/786,304

(22) Filed: Oct. 17, 2017

(65) Prior Publication Data
US 2018/0113479 A1 Apr. 26, 2018

(30) Foreign Application Priority Data

Oct. 21, 2016 (FR) ...................................... 16 60220

(51) Int. Cl.
*B64D 43/00* (2006.01)
*G05D 1/06* (2006.01)
(Continued)

(52) U.S. Cl.
CPC ........... *G05D 1/0676* (2013.01); *B64D 43/00* (2013.01); *B64D 45/04* (2013.01); *G01C 23/005* (2013.01);
(Continued)

(58) Field of Classification Search
CPC .... G05D 1/0676; G05D 1/0615; G05D 1/101; G06F 17/5009; G06F 2217/16;
(Continued)

(56) References Cited

U.S. PATENT DOCUMENTS

| 3,618,002 | A | * | 11/1971 | Stinson | ................ | G05D 1/0615 340/968 |
| 3,896,432 | A | * | 7/1975 | Young | .................. | G01C 23/005 342/33 |
| 6,676,088 | B1 | * | 1/2004 | Greene | ................ | G05D 1/0676 244/187 |

(Continued)

FOREIGN PATENT DOCUMENTS

FR          2902078          12/2007

OTHER PUBLICATIONS

Besada et al., Automated Aircraft Trajectory Prediction Based on Formal Intent-Related Language Processing, 2013, IEEE, p. 1067-1082 (Year: 2013).*

(Continued)

*Primary Examiner* — McDieunel Marc
(74) *Attorney, Agent, or Firm* — Greer, Burns & Crain Ltd.

(57) ABSTRACT

A device for managing configurations of an aircraft between an initial point and a final point comprises a computation module to determine at least one first evolution curve considering the aircraft to have assumed a first configuration and wherein the first evolution curve includes the first point and a final evolution curve considering the aircraft to have assumed at least one final configuration and wherein the final evolution curve or curves includes the final point, a computation module to compute at least one second point corresponding to the intersection of the first evolution curve or curves and the final evolution curve or curves, and a transmission module configured to transmit a signal representing the coordinates of the second point or points to a user device.

15 Claims, 7 Drawing Sheets

(51) Int. Cl.
*G01C 23/00* (2006.01)
*B64D 45/04* (2006.01)
*G06F 17/50* (2006.01)
*G08G 5/00* (2006.01)
*G08G 5/02* (2006.01)

(52) U.S. Cl.
CPC ...... *G06F 17/5009* (2013.01); *G06F 2217/16* (2013.01); *G08G 5/0021* (2013.01); *G08G 5/025* (2013.01)

(58) Field of Classification Search
CPC ........ B64D 43/00; B64D 45/04; B64D 45/00; B64D 43/02
See application file for complete search history.

(56) References Cited

U.S. PATENT DOCUMENTS

| | | | |
|---|---|---|---|
| 8,150,565 B2* | 4/2012 | Wachenheim | G05D 1/0676 701/121 |
| 8,718,933 B2* | 5/2014 | Coulmeau | G05D 1/101 701/423 |
| 9,193,476 B2* | 11/2015 | Cottet | B64D 45/00 |
| 2009/0152403 A1 | 6/2009 | Delaplace et al. | |
| 2013/0204470 A1 | 8/2013 | Luckner et al. | |
| 2014/0371957 A1* | 12/2014 | Riedinger | B64D 43/02 701/3 |

OTHER PUBLICATIONS

Zunga et al., Integrating and sequencing flows in Terminal Maneuvering Area by evolutionary algorithms, 2011, IEEE, p. 2A1-1 to 2A1-11 (Year: 2011).*
Torres et al., En-Route Automation Modernization (ERAM) trajectory model evolution to support trajectory-based operations (TBO), 2015, IEEE, p. 1A6-1 to 1A6-15 (Year: 2015).*
Treimuth et al., Parallel complexity computation based on dynamical systems, 2015, IEEE, p. IC2-1 to IC2-8 (Year: 2015).*
French Search Report, dated Jun. 21, 2017, priority document.

* cited by examiner

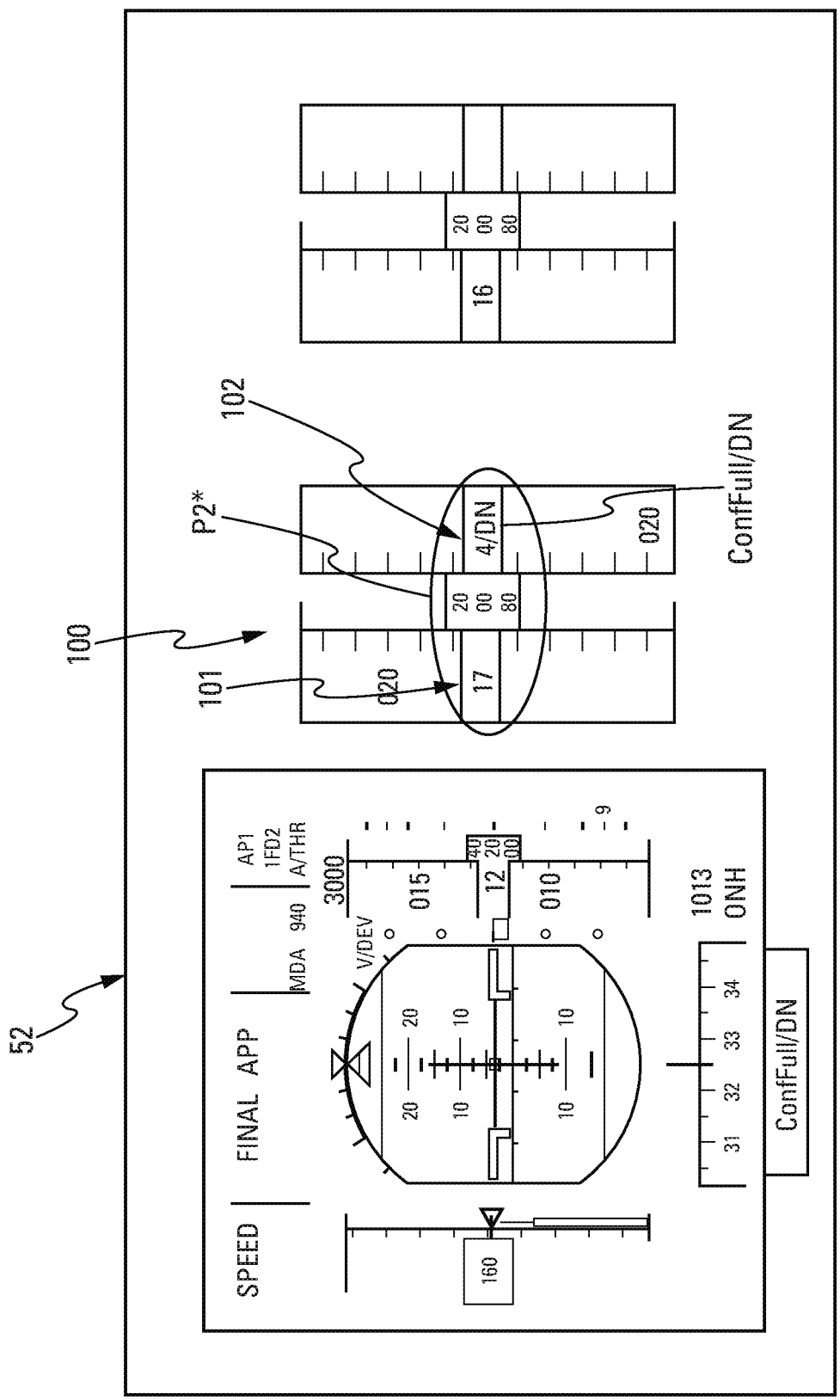

AIRCRAFT CONFIGURATION MANAGEMENT METHOD AND DEVICE

CROSS-REFERENCES TO RELATED APPLICATIONS

This application claims the benefit of the French patent application No. 1660220 filed on Oct. 21, 2016, the entire disclosures of which are incorporated herein by way of reference.

TECHNICAL FIELD

The present invention concerns an aircraft configuration management method and device.

BACKGROUND OF THE INVENTION

During the final approach of an aircraft to a landing strip (or runway) of an airport, the aircraft assumes a succession of various configurations. The aircraft has to assume a landing configuration at a stabilization point in which the flaps, the slats and the undercarriage are deployed and stabilized. The stabilization point generally corresponds to a point at which the aircraft is flying at a final approach speed plus 5 knots (approximately 9.3 km/h) at an altitude of 1000 feet (approximately 305 m) on the glide path of the runway. There exists a glide path system that makes it possible to guide the aircraft during landing by means of a vertical guide signal such as a Glide signal. This system makes it possible to perform repetitive approaches relative to a conventional slope that is generally equal to $\gamma=-3°$ in order to reduce the sonic imprint on the ground under the aircraft on final approach. However, during simulations of said system a number of problems in implementing this type of approach became apparent. In fact, during a final approach with a view to landing the aircraft assumes a succession of various configurations to reach a final configuration at the stabilization point. Now, management of exit from the various configurations along the glide path on the basis of a vertical guide signal to reach the stabilization point reliably and repetitively regardless of the external conditions is difficult.

SUMMARY OF THE INVENTION

An object of the present invention is to alleviate this disadvantage by proposing an aircraft configuration management method enabling management of the exit of the aircraft from configurations, irrespective of the glide path and irrespective of the external conditions, with the aim of reaching the stabilization point with a view to landing on a runway.

To this end, the invention concerns a method of management of configurations of an aircraft between an initial point corresponding to a first height of the aircraft flying at a first conventional air speed and a final point corresponding to a final height of the aircraft flying at a final conventional air speed.

According to the invention the method comprises the following steps:

a first computation step, executed by a first computation module, comprising determining at least one first curve of evolution of a height of the aircraft as a function of a conventional air speed of the aircraft considering the aircraft to have assumed a first configuration and that the first evolution curve includes the initial point;

a second computation step, executed by the first computation module, comprising determining at least one final curve of evolution of the height of the aircraft as a function of the conventional air speed of the aircraft considering the aircraft to have assumed at least one final configuration and that the final evolution curve or curves include(s) the final point;

a third computation step, executed by a second computation module, comprising computing at least one second point corresponding to a second height of the aircraft flying at a second conventional air speed, the second point or points corresponding to the intersection of the first evolution curve or curves and the final evolution curve or curves;

a transmission step, executed by a transmission module, comprising transmitting a signal representing coordinates of the second point or points to a user device.

Accordingly, due to the invention, it is possible to manage the sequences of configurations of an aircraft by rearrangement relative to one another of the curves corresponding to respective configurations.

According to one particular feature, each time that the aircraft passes from an $i^{th}$ configuration to an $(i+1)^{th}$ configuration, with i between 1 and N inclusive, N being the number of configurations that the aircraft can assume from the first configuration to the final configuration, the method further comprises:

a step of computation of at least one $(i+1)^{th}$ evolution curve, executed by the first computation module, comprising determining at least one $(i+1)^{th}$ curve of evolution of a height of the aircraft as a function of an air speed of the aircraft considering the aircraft to have assumed the $(i+1)^{th}$ configuration and that the $(i+1)^{th}$ curve includes the point from which the aircraft passes from the $i^{th}$ configuration to the $(i+1)^{th}$ configuration;

a step of computation of coordinates of an $(i+2)^{th}$ point, executed by the second computation module, comprising computing an $(i+2)^{th}$ point corresponding to an $(i+2)^{th}$ height of the aircraft flying at an $(i+2)^{th}$ air speed, the $(i+2)^{th}$ point corresponding to the intersection of the $(i+1)^{th}$ evolution curve and the final evolution curve;

a transmission step, executed by the transmission module, comprising transmitting a signal representing the coordinates of the $(i+2)^{th}$ point to the user device.

For example, the set of N configurations comprises at least the following configurations:

a first configuration in which the aircraft is flying with undercarriage up;

a second configuration in which the aircraft is flying with the undercarriage down;

a third configuration in which the aircraft has assumed a pre-landing configuration;

a fourth configuration in which the aircraft has assumed a landing configuration.

Moreover, the first step and the second step of computation of the curve or curves of evolution of the height of the aircraft as a function of the air speed of the aircraft comprise the following steps for each point j of the curve or curves to be computed, with j being an integer between 0 and M inclusive, M being the number of points of the curve or curves:

a step of computation of an acceleration, executed by a first computation submodule, comprising computing an acceleration of the aircraft at the point j;

a step of computation of a true air speed, executed by a second computation submodule, comprising computing a true air speed of the aircraft at the point j+1 from the acceleration of the aircraft at the point j;

a step of computation of a ground speed, executed by a third computation submodule, comprising computing a ground speed of the aircraft at the point j+1 from the true air speed of the aircraft at the point j+1;

a step of computation of a height, executed by a fourth computation submodule, comprising computing the height of the aircraft at the point j+1 from the ground speed of the aircraft at the point j+1;

a step of computation of a conventional air speed, executed by a fifth computation submodule, comprising computing the conventional air speed of the aircraft at the point j+1 from the true air speed of the aircraft at the point j+1.

According to one embodiment, the acceleration of the aircraft at the point j is computed using the following equation:

$$\left(\frac{dV}{dt}\right)^j = g\left(\left(\left(\frac{F}{mg}\right)^j - \left(\frac{1}{f(Conf,V)}\right)^j\right) - \sin\gamma_{air}^j\right),$$

in which:

$\left(\frac{dV}{dt}\right)^j$ is the acceleration of the aircraft at the point j;

g is the acceleration due to gravity;
F is the thrust of the aircraft at the point j;
M is the mass of the aircraft;
f(Conf, V) is a function depending on the drag coefficient and the air speed of the aircraft at the point j;
$\gamma_{air}^j$ is the air slope of the aircraft at the point j.

According to one embodiment, the true air speed of the aircraft at the point j+1 is computed using the following equation:

$$V_{TAS\,j+1} = \left(\frac{dV}{dt}\right)^j \Delta t + V_{TAS\,j},$$

in which:
$V_{TAS\,j+1}$ is the true air speed of the aircraft at the point j+1;
$V_{TAS\,j}$ is the true air speed of the aircraft at the point j;

$\left(\frac{dV}{dt}\right)^j$ is the acceleration of the aircraft at the point j;
$\Delta t$ is the flight time of the aircraft between the point j and the point j+1.

According to one embodiment, the ground speed of the aircraft at the point j+1 is computed using the following equation:

$$V_{SOL\,j+1} = V_{TAS\,j+1}\left(\frac{\cos\gamma_{air}^{j+1}}{\cos\gamma_{sol}}\right) + \left(\frac{W}{\cos\gamma_{sol}}\right),$$

in which:
$V_{SOL\,j+1}$ is the ground speed of the aircraft at the point j+1;
$V_{TAS\,j+1}$ is the true air speed of the aircraft at the point j+1;

$\gamma_{air}^{j+1}$ is the air slope of the aircraft at the point j+1;
$\gamma_{sol}$ is the ground slope of the aircraft;
W is the wind speed.

According to one embodiment, the height of the aircraft at the point j+1 is computed using the following equation:

$$H_{j+1} = V_{SOL\,j+1} \sin\gamma_{sol} \Delta t + H_j,$$

in which:
$H_{j+1}$ is the height of the aircraft at the point j+1;
$H_j$ is the height of the aircraft at the point j;
$V_{SOL\,j+1}$ is the ground speed of the aircraft at the point j+1;
$\gamma_{sol}$ is the ground slope of the aircraft;
$\Delta t$ is the flight time of the aircraft between the point j and the point j+1.

According to one embodiment, the conventional air speed of the aircraft at the point j+1 is computed using the following equation:

$$V_{CAS\,j+1} = V_{TAS\,j+1}\sqrt{\frac{\rho_{j+1}}{\rho_j}},$$

in which:
$V_{CAS\,j+1}$ is the conventional air speed of the aircraft at the point j+1;
$V_{TAS\,j+1}$ is the true air speed of the aircraft at the point j+1;
$\rho_j$ is the mass per unit volume of the air at the point j;
$\rho_{j+1}$ is the mass per unit volume of the air at the point j+1.

The transmission step is advantageously followed by a display step, executed by a display module forming part of the user device, comprising displaying symbolically on the display module at least the coordinates represented by the signal or signals transmitted by the transmission module to the display module.

The invention also concerns a device for management of configurations of an aircraft between an initial point corresponding to a first height of the aircraft flying at a first conventional air speed and a final point corresponding to a final height of the aircraft flying at a final conventional air speed.

According to the invention the device comprises:
a first computation module configured:
to determine at least one first curve of evolution of a height of the aircraft as a function of a conventional air speed of the aircraft considering the aircraft to have assumed a first configuration and that the first evolution curve includes the initial point;
to determine at least one final curve of evolution of the height of the aircraft as a function of the conventional air speed of the aircraft considering the aircraft to have assumed at least one final configuration and that the final evolution curve or curves include(s) the final point;
a second computation module configured to compute at least one second point corresponding to a second height of the aircraft flying at a second conventional air speed, the second point or points corresponding to the intersection of the first evolution curve or curves and the final evolution curve or curves;
a first transmission module configured to transmit a signal representing the coordinates of the second point or points to a user device.

According to one particular feature:
the first computation module is configured to determine at least one $(i+1)^{th}$ curve of evolution of a height of the aircraft as a function of a conventional air speed of the aircraft considering the aircraft to have assumed the $(i+1)^{th}$ configuration and that the curve includes the point from which the aircraft passes from the $i^{th}$ configuration to the $(i+1)^{th}$ configuration;

the second computation module is configured to compute an $(i+2)^{th}$ point corresponding to an $(i+2)^{th}$ height of the aircraft flying at an $(i+2)^{th}$ conventional air speed, the $(i+2)^{th}$ point corresponding to the intersection of the $(i+1)^{th}$ evolution curve and the final evolution curve;

the transmission module is configured to transmit a signal representing the coordinates of the $(i+2)^{th}$ point to the user device;

the first computation module, the second computation module and the transmission module being used each time that the aircraft passes from an $i^{th}$ configuration to an $(i+1)^{th}$ configuration, with i between 1 and N inclusive, N being the number of configurations that the aircraft can assume from the first configuration to the final configuration.

According to another particular feature, the first computation module comprises:

a first computation submodule configured to compute an acceleration of the aircraft at the point j;

a second computation submodule configured to compute a true air speed of the aircraft at the point j+1 from the acceleration of the aircraft at the point j;

a third computation submodule configured to compute a ground speed of the aircraft at the point j+1 from the true air speed of the aircraft at the point j+1;

a fourth computation submodule configured to compute the height of the aircraft at the point j+1 from the ground speed of the aircraft (AC) at the point j+1;

a fifth computation submodule configured to compute the conventional air speed of the aircraft at the point j+1 from the true air speed of the aircraft at the point j+1.

The device advantageously further comprises a display module forming part of the user device.

The invention also concerns an aircraft, in particular a transport aircraft, that includes a configuration management device such as that described above.

BRIEF DESCRIPTION OF THE DRAWINGS

The invention, with its features and advantages, will emerge more clearly on reading the description given with reference to the appended drawings in which:

FIGS. 4 to 7 show configurations of the display on the display module of the user device as a function of the steps of the method.

DETAILED DESCRIPTION OF THE PREFERRED EMBODIMENTS

The remainder of the description will refer to the figures cited above.

Figure 1A:
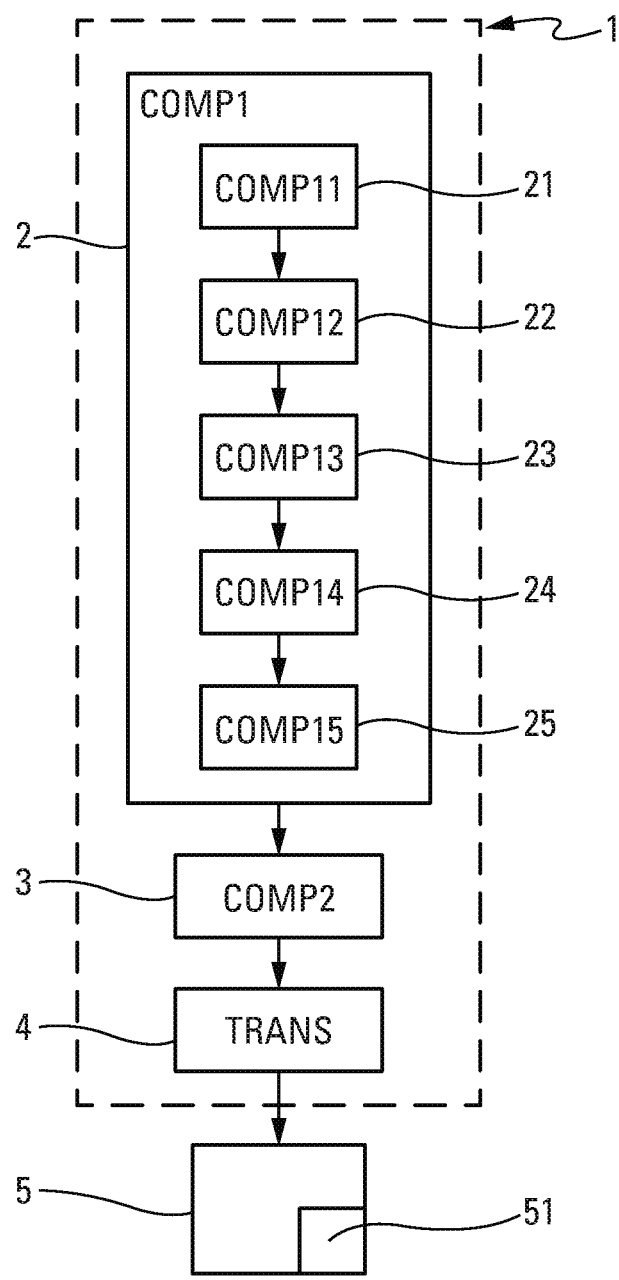
FIG. 1a is a diagrammatic representation of one embodiment of the aircraft configuration management device.
Figure 1B:
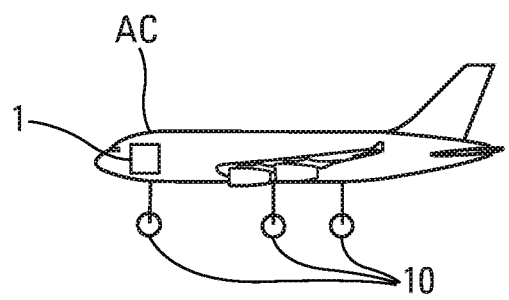
FIG. 1b shows an aircraft incorporating a configuration management device.
Figure 3:
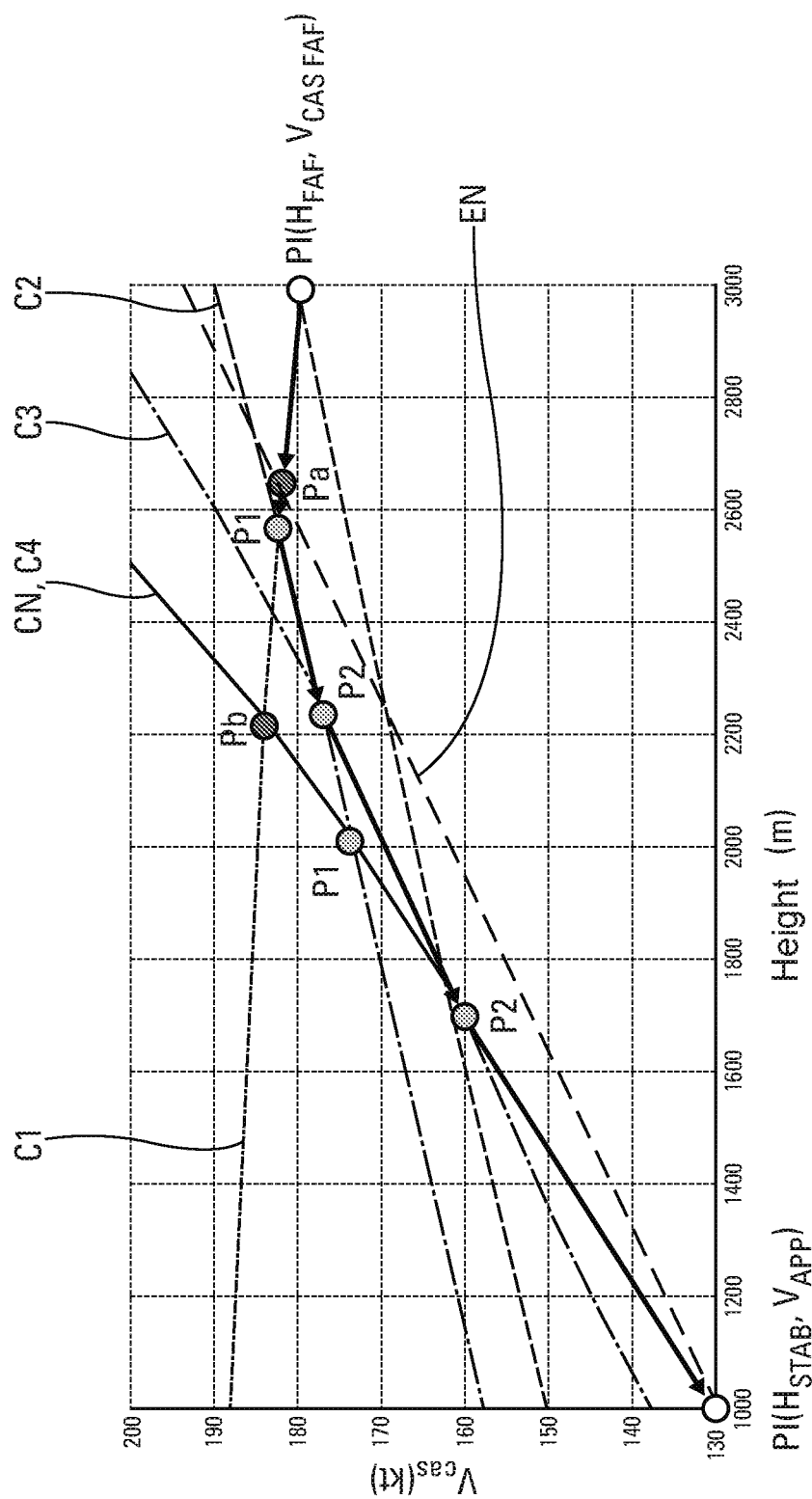
FIG. 3 illustrates the principle of the method through the representation of evolution curves corresponding to the conventional air speed of the aircraft as a function of the height of the aircraft and as a function of the configuration of the aircraft.

FIG. 1 shows one embodiment of the device 1 for management of configurations of an aircraft AC. The configuration management device is notably intended to manage configurations between an initial point PI corresponding to a first height HFAF of the aircraft AC flying at a first conventional air speed VCAS FAF and a final point PF corresponding to a final height HSTAB of the aircraft AC flying at a final conventional air speed VAPP (FIG. 3).

The conventional air speed of the aircraft AC is the air speed of the aircraft AC corrected for instrument and position errors.

According to the invention, the configuration management device 1 comprises, as shown in FIG. 1:

a computation module 2 (COMP1) configured:

to determine at least one first curve C1 (FIG. 3) of evolution of a height of the aircraft AC as a function of a conventional air speed of the aircraft considering the aircraft AC to have assumed at least one first configuration and that the evolution curve or curves C1 include(s) the initial point PI;

to determine at least one final curve EN, CN of evolution of the height of the aircraft AC as a function of the conventional air speed of the aircraft AC considering the aircraft AC to have assumed at least one final configuration and that the final evolution curve or curves EN, CN include(s) the final point PF;

a computation module 3 (COMP2) configured to compute at least one second point Pa, Pb corresponding to a second height of the aircraft flying at a second conventional air speed, the second point or points Pa, Pb corresponding to the intersection of the first evolution curve or curves C1 and the final evolution curve or curves EN, CN; and a transmission module 4 (TRANS) configured to transmit a signal representing the coordinates of the second point or points Pb to a user device 5.

The initial point PI corresponds to the final approach fix (FAF), for example.

The final point PF corresponds to the stabilization point, for example.

Depending on the configuration of the aircraft AC required by a pilot of the aircraft AC in order to reach the stabilization point PF, at least one final evolution curve EN, CN is determined in order to compute at least one second point Pa, Pb. Each evolution curve EN, CN corresponds to a respective required configuration. Depending on the position of the aircraft AC relative to the second points Pa, Pb, the pilot will be able to decide that the aircraft AC has to assume one or the other configuration in order to reach the stabilization point PF. For example, if the aircraft AC has passed the second point Pa the aircraft AC will have to assume the configuration corresponding to the second point Pb.

The aircraft AC can assume a number of configurations with a view to a landing.

It will be considered hereinafter that the aircraft can assume N configurations from the first configuration to the final configuration.

Accordingly, for an integer i between 1 and N inclusive, the computation module 2 is configured to determine at least one $(i+1)^{th}$ curve of evolution of a height of the aircraft AC as a function of the conventional air speed of the aircraft AC considering the aircraft AC to have assumed the $(i+1)^{th}$ configuration and that the curve includes the point from which the aircraft passes from the $i^{th}$ configuration to the $(i+1)^{th}$ configuration.

The computation module 3 is configured to compute an $(i+2)^{th}$ point corresponding to an $(i+2)^{th}$ height of the aircraft AC flying at an $(i+2)^{th}$ conventional air speed, the $(i+2)^{th}$ point corresponding to the intersection of the $(i+1)^{th}$ evolution curve and the final evolution curve.

The transmission module 4 is configured to transmit a signal representing the coordinates of the $(i+2)^{th}$ point to the user device 5.

The computation module 2, the computation module 3 and the transmission module 4 are used each time that the aircraft AC passes from an $i^{th}$ configuration to an $(i+1)^{th}$ configuration.

For example, the user device 5 comprises a display module 51 configured to display the coordinates of the points represented by the signal transmitted by the transmission module 4.

The set of N configurations advantageously comprises at least the following configurations:
a first configuration conf2/UP in which the aircraft AC is flying with the undercarriage 10 up;
a second configuration conf2/DN in which the aircraft AC is flying with the undercarriage 10 down;
a third configuration conf3/DN in which the aircraft AC is in a pre-landing configuration;
a fourth configuration confFull/DN in which the aircraft AC is in a landing configuration.

According to one particular feature, the computation module 2 comprises, as shown in FIG. 1:
a computation submodule 21 (COMP11) configured to compute an acceleration $$\left(\frac{dV}{dt}\right)^j$$

of the aircraft AC at the point j;
a computation submodule 22 (COMP12) configured to compute a true air speed $V_{TAS\,j+1}$ of the aircraft AC at the point j+1 from the acceleration $$\left(\frac{dV}{dt}\right)^j$$

of the aircraft AC at the point j;
a computation submodule 23 (COMP13) configured to compute a ground speed $V_{SOL\,j+1}$ of the aircraft AC at the point j+1 from the true air speed $V_{TAS\,j+1}$ of the aircraft AC at the point j+1;
a computation submodule 24 (COMP14) configured to compute the height $H_{j+1}$ of the aircraft AC at the point j+1 from the ground speed $V_{SOL\,j+1}$ of the aircraft AC at the point j+1;
a computation submodule 25 (COMP15) configured to compute the conventional air speed $V_{CAS\,j+1}$ of the aircraft AC at the point j+1 from the true air speed $V_{TAS\,j+1}$ of the aircraft AC at the point j+1.

According to one embodiment, the computation submodule 21 computes the acceleration $$\left(\frac{dV}{dt}\right)^j$$

of the aircraft AC at the point j using the following equation:

$$\left(\frac{dV}{dt}\right)^j = g\left(\left(\left(\frac{F}{mg}\right)^j - \left(\frac{1}{f(Conf,V)}\right)^j\right) - \sin\gamma_{air}^j\right),$$

in which:

$$\left(\frac{dV}{dt}\right)^j$$

is the acceleration of the aircraft AC at the point j;
g is the acceleration due to gravity;
F is the thrust of the aircraft AC at the point j;
M is the mass of the aircraft AC;
f(Conf, V) is a function depending on the drag coefficient and the air speed of the aircraft AC at the point j;
$\gamma_{air}^j$ is the air slope of the aircraft AC at the point j.

The computation submodule 22 computes the true air speed $V_{TAS\,j+1}$ of the aircraft AC at the point j+1 using the following equation:

$$V_{TAS\,j+1} = \left(\frac{dV}{dt}\right)^j \Delta t + V_{TAS\,j},$$

in which:
$V_{TAS\,j+1}$ is the true air speed of the aircraft AC at the point j+1;
$V_{TAS\,j}$ is the true air speed of the aircraft AC at the point j;

$$\left(\frac{dV}{dt}\right)^j$$

is the acceleration of the aircraft AC at the point j;
$\Delta t$ is the flight time of the aircraft AC between the point j and the point j+1.

The true air speed of the aircraft AC is the speed of the aircraft AC relative to the surrounding air.

The computation submodule 23 computes the ground speed $V_{SOL\,j+1}$ of the aircraft AC at the point j+1 using the following equation:

$$V_{SOL\,j+1} = V_{TAS\,j+1}\left(\frac{\cos\gamma_{air}^{j+1}}{\cos\gamma_{sol}}\right) + \left(\frac{W}{\cos\gamma_{sol}}\right),$$

in which:
$V_{SOL\,j+1}$ is the ground speed of the aircraft AC at the point j+1;
$V_{TAS\,j+1}$ is the true air speed of the aircraft AC at the point j+1;
$\gamma_{air}^{j+1}$ is the air slope of the aircraft AC at the point j+1;
$\gamma_{sol}$ is the ground slope of the aircraft AC;
W is the wind speed.

The ground speed of the aircraft AC is the speed of the aircraft AC relative to the ground.

The computation submodule 24 computes the height $H_{j+1}$ of the aircraft AC at the point j+1 using the following equation:

$$H_{j+1} = V_{SOL\,j+1} \sin\gamma_{sol}\Delta t + H_j,$$

in which:
$H_{j+1}$ is the height of the aircraft AC at the point j+1;
$H_j$ is the height of the aircraft AC at the point j;
$V_{SOL\,j+1}$ is the ground speed of the aircraft AC at the point j+1;
$\gamma_{sol}$ is the ground slope of the aircraft AC;

Δt is the flight time of the aircraft AC between the point j and the point j+1.

The computation submodule 25 computes the conventional air speed $V_{CAS\,j+1}$ of the aircraft AC at the point j+1 using the following equation:

$$V_{CAS\,j+1} = V_{TAS\,j+1}\sqrt{\frac{\rho_{j+1}}{\rho_j}},$$

in which:

$V_{CAS\,j+1}$ is the conventional air speed of the aircraft AC at the point j+1;

$V_{TAS\,j+1}$ is the true air speed of the aircraft AC at the point j+1;

$\rho_j$ is the mass per unit volume of the air at the point j;

$\rho_{j+}$, is the mass per unit volume of the air at the point j+1.

According to one embodiment, the modules COMP1, COMP2, COMP11, COMP12, COMP13, COMP14, COMP15, TRANS are integrated into a central unit or a computer.

For example, the modules can be algorithms executed in software or hardware in the central unit 13. In particular, the modules can be stored in at least one memory area of the central unit.

The configuration management device as described above executes the steps of a configuration management method.

Figure 2:
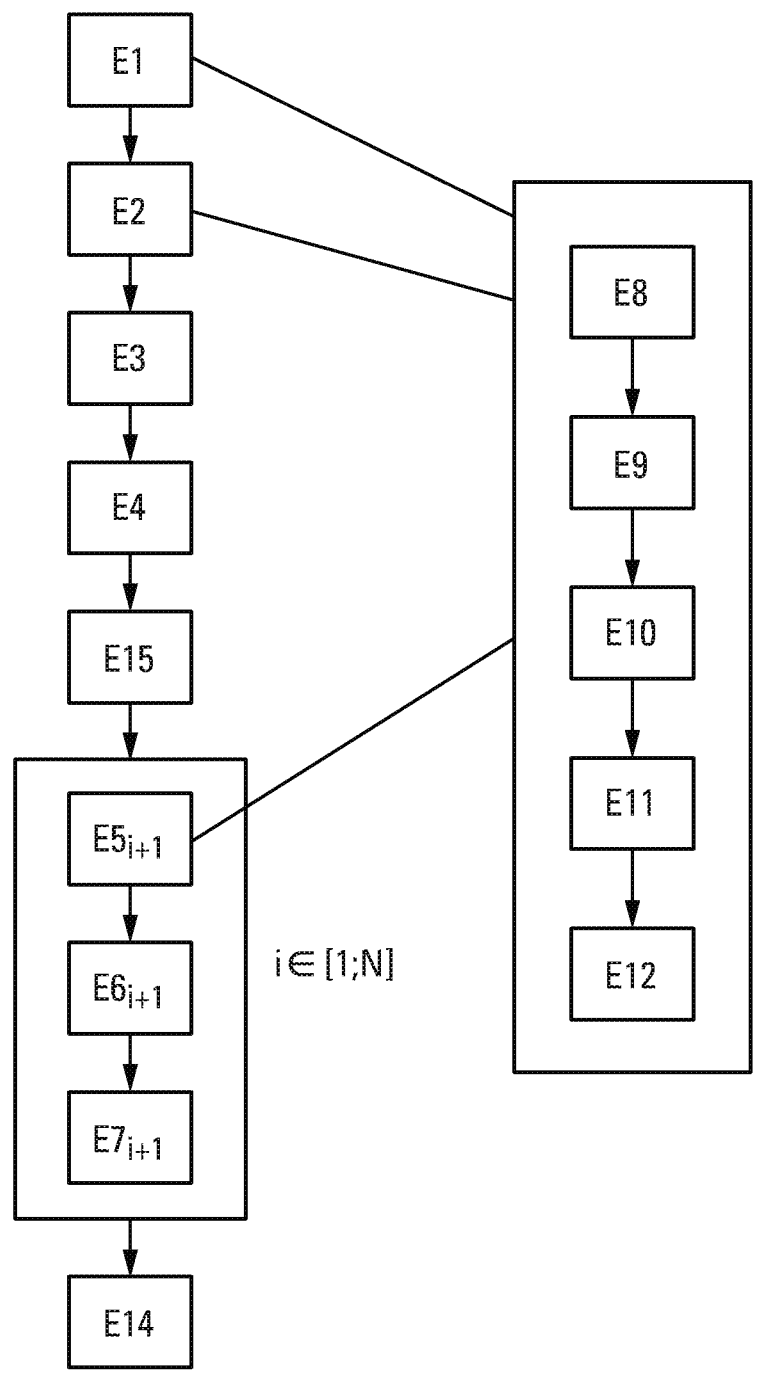
FIG. 2 is a synoptic representation of the configuration management method.

The configuration management method comprises the following steps (FIG. 2):

a first computation step E1, executed by a first computation module 2, comprising determining at least one first curve C1 of evolution of a height of the aircraft AC as a function of a conventional air speed of the aircraft AC considering the aircraft to have assumed a first configuration and that the first evolution curve C1 includes the initial point PI;

a second computation step E2, executed by the first computation module 2, comprising determining at least one final curve CN of evolution of the height of the aircraft AC as a function of the conventional air speed of the aircraft AC considering the aircraft AC to have assumed one final configuration and that the final evolution curve CN includes the final point PF;

a third computation step E3, executed by a second computation module 3, comprising computing a second point Pb corresponding to a second height of the aircraft AC flying at a second conventional air speed, the second point Pb corresponding to the intersection of the first evolution curve C1 and the final evolution curve CN;

a transmission step E4, executed by a transmission module 4, comprising transmitting a signal representing the coordinates of the second point Pb to a user device 5.

According to one particular feature, each time that the aircraft AC passes from an $i^{th}$ configuration to an $(i+1)^{th}$ configuration, with i between 1 and N inclusive, N being the number of configurations that the aircraft AC can assume from the first configuration to the final configuration, the method further comprises:

a step E5i+1 of computing at least one $(i+1)^{th}$ evolution curve, executed by the first computation module 2, comprising determining at least one $(i+1)^{th}$ curve of evolution of a height of the aircraft AC as a function of an air speed of the aircraft AC considering the aircraft AC to have assumed the $(i+1)^{th}$ configuration and that the $(i+1)^{th}$ curve includes the point from which the aircraft AC passes from the $i^{th}$ configuration to the $(i+1)^{th}$ configuration;

a step E6i+1 of computation of the coordinates of an $(i+2)^{th}$ point, executed by the second computation module 3, comprising computing an $(i+2)^{th}$ point corresponding to an $(i+2)^{th}$ height of the aircraft AC flying at an $(i+2)^{th}$ air speed, the $(i+2)^{th}$ point corresponding to the intersection of the $(i+1)^{th}$ evolution curve and the final evolution curve CN;

a transmission step E7i+1, executed by the transmission module 4, comprising transmitting a signal representing the coordinates of the $(i+2)^{th}$ point to the user device 5.

According to another particular feature, the step or steps E1, E2 and E5i+1 of computation of the curve or curves of evolution of the height of the aircraft AC as a function of the air speed of the aircraft AC comprise the following steps for each point j of the curve or curves to be computed, with j being an integer between 0 and M inclusive, M being the number of points of the curve or curves:

a step E8 of computation of an acceleration $$\left(\frac{dV}{dt}\right)^j,$$

executed by a first computation submodule 21, comprising computing an acceleration $$\left(\frac{dV}{dt}\right)^j$$

of the aircraft AC at the point j;

a step E9 of computation of a true air speed $V_{TAS\,j+1}$, executed by a second computation submodule 22, comprising computing a true air speed $V_{TAS\,j+1}$, of the aircraft AC at the point j+1 from the acceleration $$\left(\frac{dV}{dt}\right)^j$$

of the aircraft AC at the point j;

a step E10 of computation of a ground speed $V_{SOL\,j+1}$, executed by a third computation submodule 23, comprising computing a ground speed $V_{SOL\,j+1}$ of the aircraft AC at the point j+1 from the true air speed $V_{TAS\,j+1}$ of the aircraft AC at the point j+1;

a step E11 of computation of a height $H_{j+1}$, executed by a fourth computation submodule 24, comprising computing the height $H_{j+1}$ of the aircraft AC at the point j+1 from the ground speed $V_{SOL\,j+1}$ of the aircraft AC at the point j+1;

a step E12 of computation of a conventional air speed $V_{CAS\,j+1}$, executed by a fifth computation submodule 25, comprising computing the conventional air speed $V_{CAS\,j+1}$ of the aircraft AC at the point j+1 from the true air speed $V_{TAS\,j+1}$ of the aircraft AC at the point j+1.

The transmission step E4, E7i+1 is advantageously followed by a display step E14, E15, executed by a display module 51 forming part of the user device 5, comprising displaying symbolically on the display module 51 at least the coordinates represented by the signal or signals transmitted by the transmission module 4 to the display module 51.

FIG. 3 shows an example of the evolution of the flight path of the aircraft AC. FIGS. 4 to 7 show a possible display 52 on the display module 51 of the user device 5.

The display module 51 is configured to display a banner 100 representing a current position 101 of the aircraft AC associated with the current configuration 102. It is also configured to display another "latest" position 103 associated with a future configuration 104. The "latest" position 103 corresponds to a "latest" point before the aircraft AC has to assume the associated future configuration 104.

In this example, the configurations of the aircraft AC are considered to succeed one another in the following sequence:
  a first configuration conf2/UP in which the aircraft AC is flying with the undercarriage 10 up;
  a second configuration conf2/DN in which the aircraft AC is flying with the undercarriage 10 down;
  a third configuration conf3/DN in which the aircraft AC is in a pre-landing configuration;
  a fourth configuration confFull/DN in which the aircraft AC is in a landing configuration.

In this example, the method comprises:
  a first computation step E1, executed by the first computation module 2, comprising determining at least one first curve C1 of evolution of a height of the aircraft AC as a function of a conventional air speed of the aircraft AC considering the aircraft AC to have assumed the first configuration conf2/UP and that the first evolution curve C1 includes the initial point PI;
  a second computation step E2, executed by the first computation module 2, comprising determining a fourth evolution curve C4 considering the aircraft AC to have assumed the fourth configuration confFull/DN and that the fourth evolution curve C4 includes the stabilization point PF and a fourth evolution curve EN considering the aircraft AC to have assumed the third configuration conf3/DN and that the fourth evolution curve EN includes the stabilization point PF;
  a third computation step E3, executed by the second computation module 3, comprising computing a second point Pb corresponding to a second height of the aircraft AC flying at a second conventional air speed, the second point Pb corresponding to the intersection of the first evolution curve C1 and the fourth evolution curve C4; the third step also comprising computing a second point Pa corresponding to a second height of the aircraft AC flying at a second conventional air speed, the second point Pa corresponding to the intersection of the first evolution curve C1 and the fourth evolution curve EN;
  a transmission step E4, executed by the transmission module 4, comprising transmitting a signal representing coordinates of the second point Pb and the second point Pa to a user device 5.

In the FIG. 3 example, the point Pa is reached more quickly than the point Pb.

If the point Pa has not yet been reached, the pilot of the aircraft AC still has a choice between the third configuration conf3/DN and the fourth configuration confFull/DN for the aircraft AC to assume at the stabilization point PF.

If the pilot chooses the third configuration conf3/DN, the display module 51 displays the point Pa as being the latest point at which the passage to the third configuration conf3/DN must be effected. Otherwise, if the pilot chooses the fourth configuration confFull/DN, the display module 51 displays the point Pb as being the latest point at which the passage to the fourth configuration confFull/DN must be effected.

Figure 4:
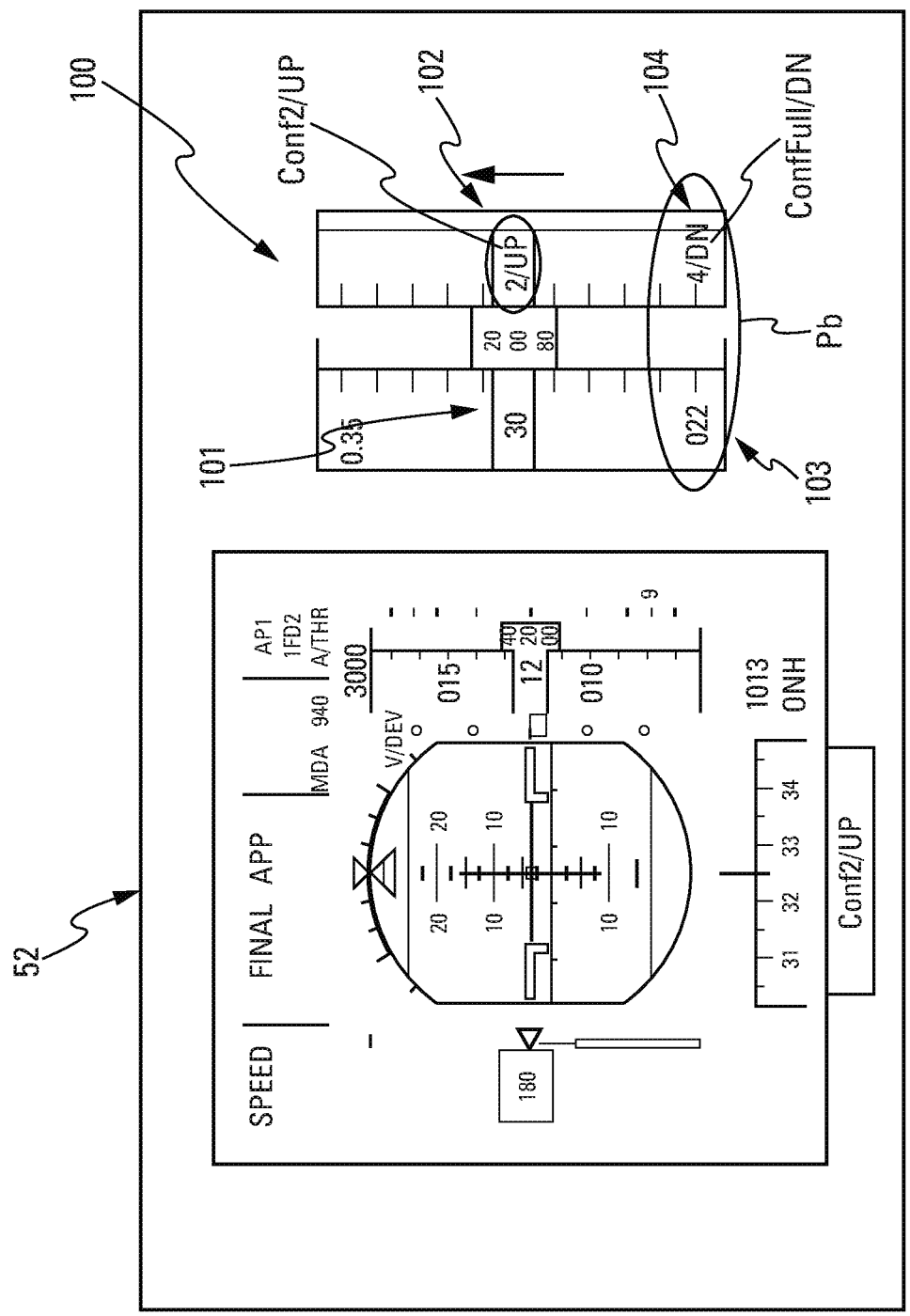

If, as in the FIG. 3 example, the point Pa has been passed, the aircraft AC can assume only the fourth configuration confFull/DN to be certain of reaching the stabilization point PF. The display module 51 therefore displays the point Pb as being the latest point at which the passage to the fourth configuration confFull/DN must be effected (FIG. 4).

When the aircraft AC passes from the first configuration conf2/UP to the second configuration conf2/DN, for i=1, the method comprises:
  a computation step E5,2 executed by the first computation module 2, comprising determining at least one second curve C2 of evolution of a height of the aircraft AC as a function of an air speed of the aircraft AC considering the aircraft AC to have assumed the second configuration conf2/DN and that the curve includes the point P1 from which the aircraft AC passes from the first configuration conf2/UP to the second configuration conf2/DN;
  a computation step E6,2 executed by the second computation module 3, comprising computing a third point P1* corresponding to a third height of the aircraft AC moving at a third air speed, the third point P1* corresponding to the intersection of the second evolution curve C2 and the final evolution curve C4;
  a transmission step E7,2 executed by the transmission module 4, comprising transmitting a signal representing the coordinates of the third point P1* to the user device 5.

Figure 5:
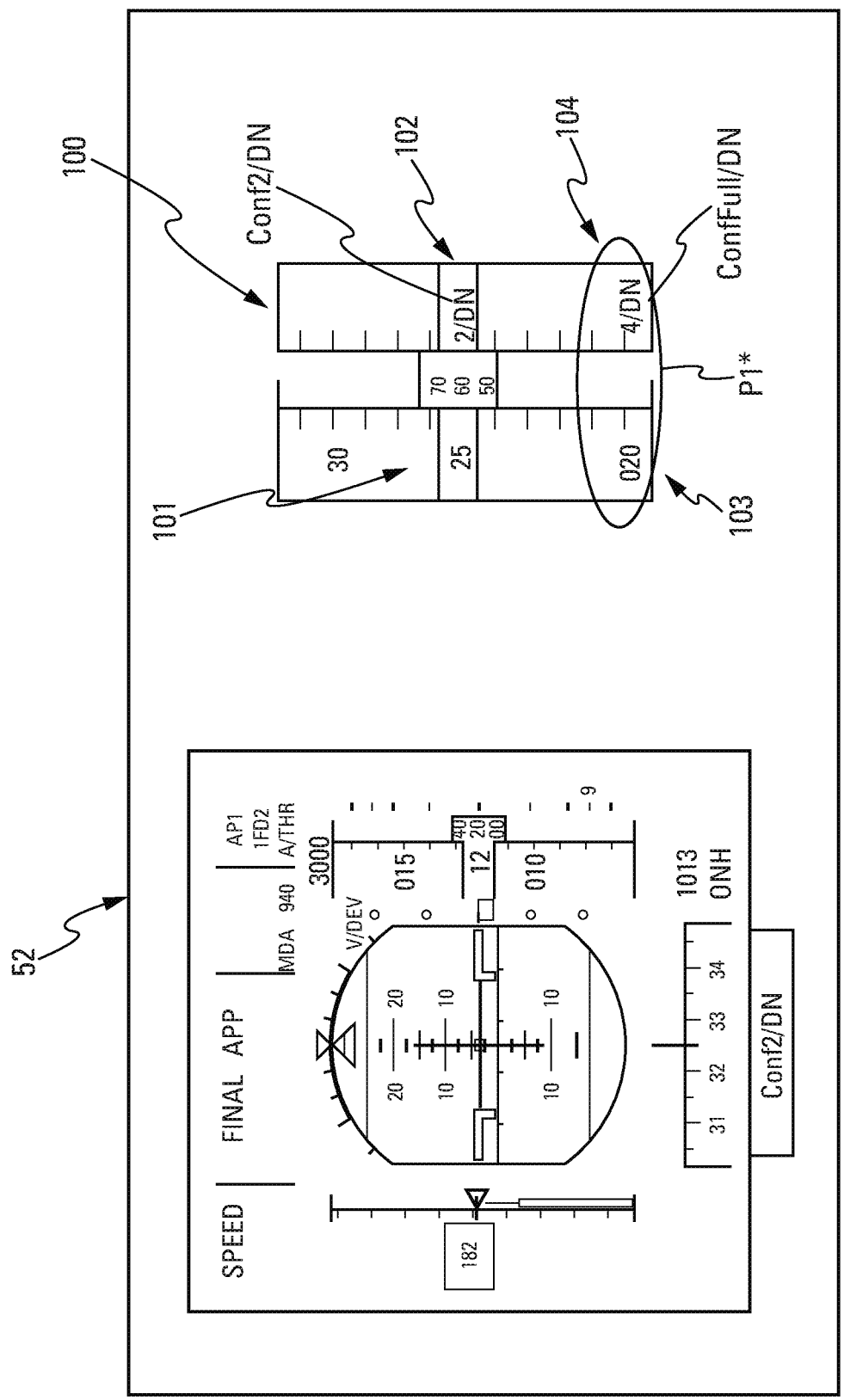

The display module 51 displays the point P1* as being the latest point at which the passage to the fourth configuration confFull/DN must be effected (FIG. 5).

When the aircraft AC passes from the second configuration conf2/DN to the third configuration conf3/DN, for i=2, the method further comprises:
  a computation step E5,3 executed by the first computation module 2, comprising determining at least one third curve C3 of evolution of a height of the aircraft AC as a function of an air speed of the aircraft AC considering the aircraft to have assumed the third configuration conf3/DN and that the curve includes the point P2 from which the aircraft AC passes from the second configuration conf2/DN to the third configuration conf3/DN;
  a computation step E6,3 executed by the second computation module 3, comprising computing a fourth point P2* corresponding to a fourth height of the aircraft AC moving at a fourth air speed, the fourth point P2* corresponding to the intersection of the third evolution curve C3 and the final evolution curve C4;
  a transmission step E7,3 executed by the transmission module 4, comprising transmitting a signal representing the coordinates of the fourth point P2* to the user device 5.

Figure 6:
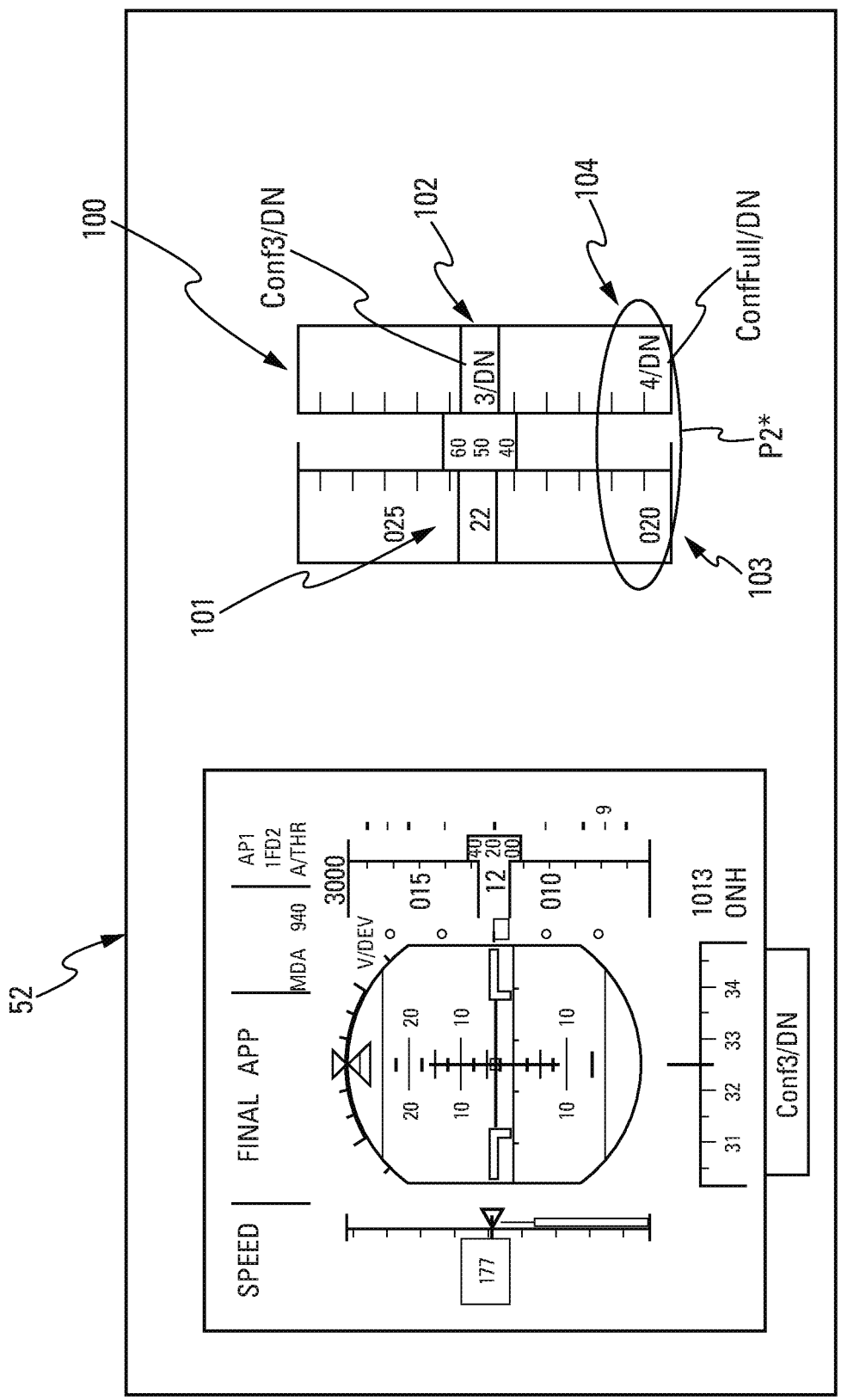

The display module 51 displays the point P2* as being the latest point at which the passage to the fourth configuration confFull/DN must be effected (FIG. 6).

The fourth point P2* corresponds to the point at which the aircraft AC must pass from the third configuration conf3/DN to the fourth configuration confFull/DN to be certain of reaching the stabilization point PF.

After the aircraft AC has assumed the fourth configuration confFull/DN, the display module 51 no longer displays the "latest" points (FIG. 7).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method of management of configurations of an aircraft between an initial point corresponding to a first height of the aircraft flying at a first conventional air speed and a final point corresponding to a final height of the aircraft flying at a final conventional air speed, comprising the following steps:

computing, in a first computation step, executed by a first computation module integrated in a computer, comprising determining at least one first curve of evolution of the first height of the aircraft as a function of the first conventional air speed of the aircraft considering the aircraft to have assumed a first configuration and that the first evolution curve includes the initial point;

computing, in a second computation step, executed by the first computation module integrated in the computer, comprising determining at least one final curve of evolution of the final height of the aircraft as a function of the final conventional air speed of the aircraft considering the aircraft to have assumed at least one final configuration and that the final evolution curve or curves includes the final point;

computing, in a third computation step, executed by a second computation module integrated in the computer, comprising computing at least one second point corresponding to a second height of the aircraft flying at a second conventional air speed, the second point or points corresponding to the intersection of the first evolution curve or curves and the final evolution curve or curves;

transmitting in a transmission step, executed by a transmission module integrated in the computer, comprising transmitting a signal representing the coordinates of the second point or points to a user device.

2. The method according to claim 1, wherein each time that the aircraft passes from an $i^{th}$ configuration to an $(i+1)^{th}$ configuration, with i between 1 and N inclusive, N being the number of configurations that the aircraft can assume from the first configuration to the final configuration, the method further comprises:

computing, in a step of computation of at least one $(i+1)^{th}$ evolution curve, executed by the first computation module, comprising determining at least one $(i+1)^{th}$ curve of evolution of a height of the aircraft as a function of an air speed of the aircraft considering the aircraft to have assumed the $(i+1)^{th}$ configuration and wherein the $(i+1)^{th}$ curve includes the point from which the aircraft passes from the $i^{th}$ configuration to the $(i+1)^{th}$ configuration;

computing in a step of computation of the coordinates of an $(i+2)^{th}$ point, executed by the second computation module, comprising computing an $(i+2)^{th}$ point corresponding to an $(i+2)^{th}$ height of the aircraft flying at an $(i+2)^{th}$ air speed, the $(i+2)^{th}$ point corresponding to the intersection of the $(i+1)^{th}$ evolution curve and the final evolution curve;

transmitting in a transmission step, executed by the transmission module, comprising transmitting a signal representing the coordinates of the $(i+2)^{th}$ point to the user device.

3. The method according to claim 1, wherein the set of N configurations comprises at least the following configurations:

a first configuration in which the aircraft is flying with the undercarriage up;

a second configuration in which the aircraft is flying with the undercarriage down;

a third configuration in which the aircraft is in a pre-landing configuration;

a fourth configuration in which the aircraft is in a landing configuration.

4. The method according to claim 1, wherein the first step and the second step of computation of the curve or curves of evolution of the height of the aircraft as a function of the air speed of the aircraft comprise the following steps for each point j of the curve or curves to be computed, with j being an integer between 0 and M inclusive, M being the number of points of the curve or curves:

computing in a step of computation of an acceleration, executed by a first computation submodule, comprising computing an acceleration of the aircraft at the point j;

computing in a step of computation of a true air speed, executed by a second computation submodule, comprising computing a true air speed, of the aircraft at the point j+1 from the acceleration of the aircraft at the point j;

computing in a step of computation of a ground speed, executed by a third computation submodule, comprising computing a ground speed of the aircraft at the point j+1 from the true air speed of the aircraft at the point j+1;

computing in a step of computation of a height, executed by a fourth computation submodule, comprising computing the height of the aircraft at the point j+1 from the ground speed of the aircraft at the point j+1;

computing in a step of computation of a conventional air speed, executed by a fifth computation submodule, comprising computing the conventional air speed of the aircraft at the point j+1 from the true air speed of the aircraft at the point j+1.

5. The method according to claim 4, wherein the acceleration of the aircraft at the point j is computed using the following equation:

$$\left(\frac{dV}{dt}\right)^j = g\left(\left(\left(\frac{F}{mg}\right)^j - \left(\frac{1}{f(Conf, V)}\right)^j\right) - \sin\gamma_{air}^j\right),$$

in which:

$$\left(\frac{dV}{dt}\right)^j$$

is the acceleration of the aircraft at the point j;

g is the acceleration due to gravity;

F is the thrust of the aircraft at the point j;

M is the mass of the aircraft;

f(Conf, V) is a function depending on the drag coefficient and the air speed of the aircraft at the point j;

$\gamma_{air}^j$ is the air slope of the aircraft at the point j.

6. The method according to claim 4, wherein the true air speed of the aircraft at the point j+1 is computed using the following equation:

$$V_{TAS\,j+1} = \left(\frac{dV}{dt}\right)^j \Delta t + V_{TAS\,j},$$

in which:
$V_{TAS\,j+1}$ is the true air speed of the aircraft (AC) at the point j+1;
$V_{TAS\,j}$ is the true air speed of the aircraft (AC) at the point j;

$$\left(\frac{dV}{dt}\right)^j$$

is the acceleration of the aircraft (AC) at the point j;
$\Delta t$ is the flight time of the aircraft (AC) between the point j and the point j+1.

7. The method according to claim 4, wherein the ground speed of the aircraft at the point j+1 is computed using the following equation:

$$V_{SOL,j+1} = V_{TAS\,j+1}\left(\frac{\cos\gamma_{air}^{j+1}}{\cos\gamma_{sol}}\right) + \left(\frac{W}{\cos\gamma_{sol}}\right),$$

in which:
$V_{SOL\,j+1}$ is the ground speed of the aircraft (AC) at the point j+1;
$V_{TAS\,j+1}$ is the true air speed of the aircraft (AC) at the point j+1;
$\gamma_{air}^{j+1}$ is the air slope of the aircraft (AC) at the point j+1;
$\gamma_{sol}$ is the ground slope of the aircraft (AC);
W is the wind speed.

8. The method according to claim 4, wherein the height of the aircraft at the point j+1 is computed using the following equation:

$$H_{j+1} = V_{SOL\,j+1}\sin\gamma_{sol}\Delta t + H_j,$$

in which:
$H_{j+1}$ is the height of the aircraft (AC) at the point j+1;
$H_j$ is the height of the aircraft (AC) at the point j;
$V_{SOL\,j+1}$ is the ground speed of the aircraft (AC) at the point j+1;
$\gamma_{sd}$ is the ground slope of the aircraft (AC);
$\Delta t$ is the flight time of the aircraft (AC) between the point j and the point j+1.

9. The method according to claim 4, wherein the conventional air speed of the aircraft at the point j+1 is computed using the following equation:

$$V_{CAS\,j+1} = V_{TAS\,j+1}\sqrt{\frac{\rho_{j+1}}{\rho_j}},$$

in which:
$V_{CAS\,j+1}$ is the conventional air speed of the aircraft at the point j+1;
$V_{TAS\,j+1}$ is the true air speed of the aircraft at the point j+1;
$\rho_j$ is the mass per unit volume of the air at the point j;
$\rho_{j+1}$ is the mass per unit volume of the air at the point j+1.

10. The method according to claim 1, wherein the transmission step is followed by a display step, executed by a display module forming part of the user device, comprising displaying symbolically on the display module at least the coordinates represented by the signal or signals transmitted by the transmission module to the display module.

11. A device for management of configurations of an aircraft between an initial point corresponding to a first height of the aircraft flying at a first conventional air speed and a final point corresponding to a final height of the aircraft flying at a final conventional air speed, comprising:
a first computation module integrated in a computer and configured:
to determine at least one first curve of evolution of the first height of the aircraft as a function of the first conventional air speed of the aircraft considering the aircraft to have assumed a first configuration and that the first evolution curve includes the initial point;
to determine at least one final curve of evolution of the final height of the aircraft as a function of the final conventional air speed of the aircraft considering the aircraft to have assumed at least one final configuration and that the final evolution curve or curves includes the final point;
a second computation module integrated in the computer and configured to compute at least one second point corresponding to a second height of the aircraft flying at a second conventional air speed, the second point or points corresponding to the intersection of the first evolution curve or curves and the final evolution curve or curves; and,
a transmission module integrated in the computer and configured to transmit a signal representing the coordinates of the second point or points to a user device.

12. The device according to claim 11, wherein:
the first computation module is configured to determine at least one $(i+1)^{th}$ curve of evolution of a height of the aircraft as a function of a conventional air speed of the aircraft considering the aircraft to have assumed an $(i+1)^{th}$ configuration and that the curve includes the point from which the aircraft passes from an $i^{th}$ configuration to the $(i+1)^{th}$ configuration;
the second computation module is configured to compute an $(i+2)^{th}$ point corresponding to an $(i+2)^{th}$ height of the aircraft flying at an $(i+2)^{th}$ conventional air speed, the $(i+2)^{th}$ point corresponding to the intersection of the $(i+1)^{th}$ evolution curve and the final evolution curve;
the transmission module is configured to transmit a signal representing the coordinates of the $(i+2)^{th}$ point to the user device;
the first computation module, the second computation module and the transmission module being used each time that the aircraft passes from the $i^{th}$ configuration to the $(i+1)^{th}$ configuration, with i between 1 and N inclusive, N being the number of configurations that the aircraft can assume from the initial configuration to the final configuration.

13. The device according to claim 11, wherein the first computation module comprises:
a first computation submodule configured to compute an acceleration of the aircraft at a point j;
a second computation submodule configured to compute a true air speed of the aircraft at the point j+1 from the acceleration of the aircraft at the point j;
a third computation submodule configured to compute a ground speed of the aircraft at the point j+1 from the true air speed of the aircraft at the point j+1;

a fourth computation submodule configured to compute the height of the aircraft at the point j+1 from the ground speed of the aircraft at the point j+1;

a fifth computation submodule configured to compute the conventional air speed of the aircraft at the point j+1 from the true air speed of the aircraft at the point j+1.

14. The device according to claim 11, further comprising a display module forming part of the user device.

15. An aircraft comprising a configuration management device according to claim 11.

* * * * *